(No Model.) 2 Sheets—Sheet 1.
M. E. ELLSWORTH.
CAR BRAKE.
No. 491,094. Patented Feb. 7, 1893.
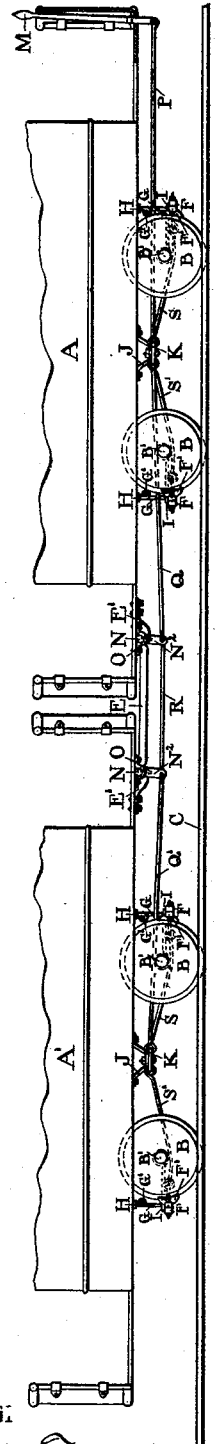
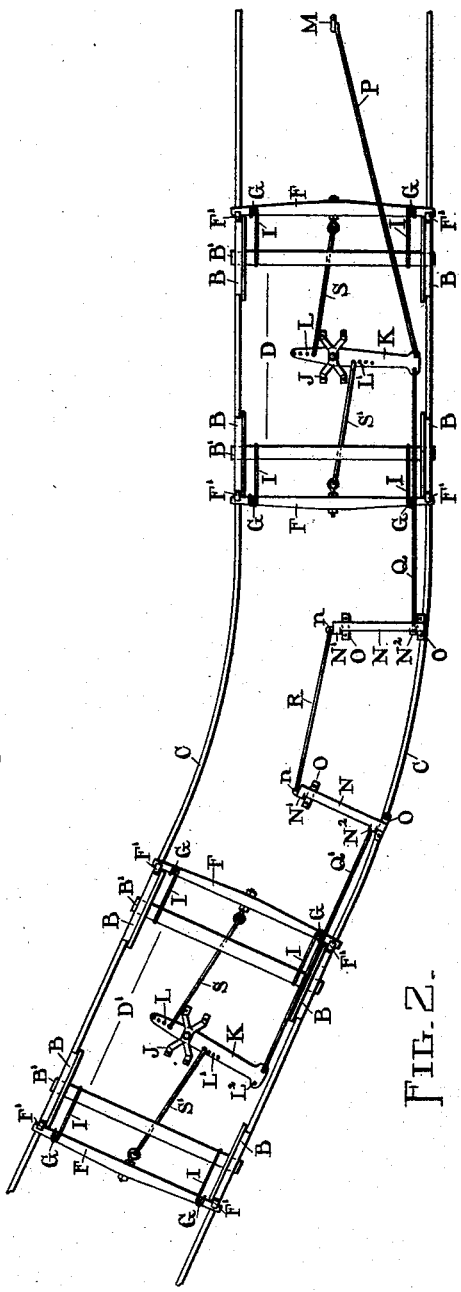
WITNESSES:
INVENTOR:

(No Model.) 2 Sheets—Sheet 2.

M. E. ELLSWORTH.
CAR BRAKE.

No. 491,094. Patented Feb. 7, 1893.

WITNESSES: INVENTOR:
M. E. Ellsworth
By W. H. Burridge
Atty.

THE NORRIS PETERS CO., PHOTO-LITHO., WASHINGTON, D. C.

UNITED STATES PATENT OFFICE.

MARCUS E. ELLSWORTH, OF HUDSON, OHIO.

CAR-BRAKE.

SPECIFICATION forming part of Letters Patent No. 491,094, dated February 7, 1893.

Application filed October 27, 1892. Serial No. 450,131. (No model.)

*To all whom it may concern:*

Be it known that I, MARCUS E. ELLSWORTH, a citizen of the United States, residing at Hudson, in the county of Summit and State of Ohio, have invented certain new and useful Improvements in Car-Brakes, of which the following is a full, clear, and complete description of said brakes for railway-cars.

My invention consists of a shaft having two integral arms, a perforated lever and a series of rods, arranged to operate car brakes.

The object of my improvement is to provide a device whereby the brakes on a train of cars may be as effectually operated when said train is upon a curve as when upon a straight track.

My device is particularly adapted for use on street-cars and with it the trail-car may be easily and readily governed, while on a curve, by the operator upon the front platform of the forward car. With the ordinary mechanism for controlling trail-cars, the brake-shoes are either applied to the wheels with a superabundance of power, while on a curve, or else with an insufficient amount, so that it is practically impossible to control said car by means of the brake and my invention is intended to overcome this difficulty.

That my invention may be seen and fully understood by others, reference will be had to the following specification and annexed drawings, forming part thereof, in which—

Figure 3:
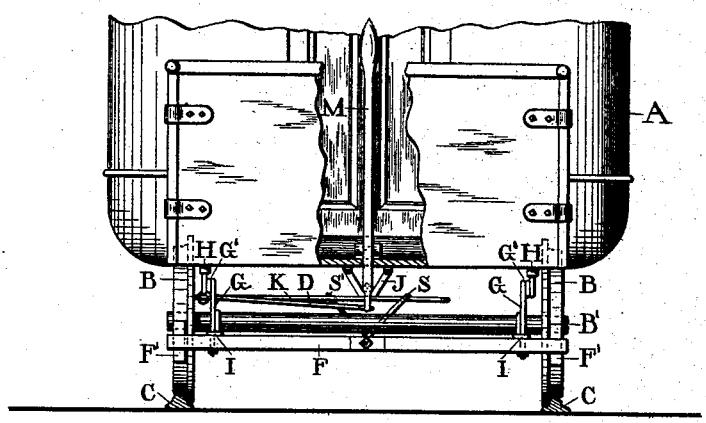
Figure 4:
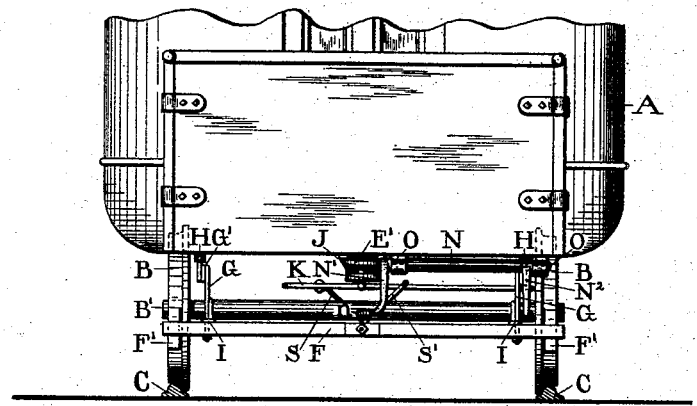
Figure 5:
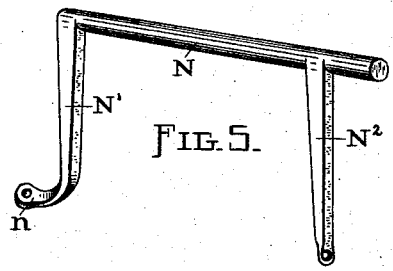

Figure 1, Plate 1, is a side view of two cars, with my device attached thereto; Fig. 2, Plate 1, a top view of the device, in connection with the car trucks, standing upon a curved track; Figs. 3 and 4, Plate 2, are opposite end views of the forward car, enlarged, with my apparatus in position; Fig. 5, Plate 2, a perspective view of the double armed shaft and Fig. 6, Plate 2, a top view of the lever, showing the perforations.

Similar letters of reference designate like parts in the drawings and specification.

The motor or propelling car A and the trail-car A' are mounted on the wheels B, which rest on the track C. The axles B' connect each pair of wheels B and, in connection with said wheels, constitute the trucks D and D', shown in Fig. 2, the framework of said trucks being omitted in the drawings. The cars A and A' are coupled together by means of the draw-bar E, Fig. 1, which is pivoted to the draw-heads E', Figs. 1 and 4.

The brake-bars F, having the brake-shoes F' attached to opposite ends thereof, are of the ordinary construction and suspended from the bottom of the cars A and A' by the hangers G. The hangers G are constructed of heavy spring wire and depend from the sleeves H, Figs. 1, 3 and 4, said sleeves being secured to the car-bottom. Between the sleeves H and the brake-bars F, on the hangers G, are the loops G', which give a sufficient amount of resiliency to said hangers to carry the brake-bars away from the wheels B, when not under the influence of a superior force.

The stops I, best shown in Fig. 2, are secured to the axles B' and have eyes in their free terminals through which are passed the hangers G. The purpose of the stops I is to limit the movement, from the wheels B, of the brake-bars F, which is accomplished by the hangers G coming in contact with the end of the eyes in said stops.

I do not confine myself to the form of a hanger and spring shown and described, as any of the ordinary appliances for suspending the brake-bar and forcing the same away from the wheels may be employed in connection with my improvements.

Figure 6:
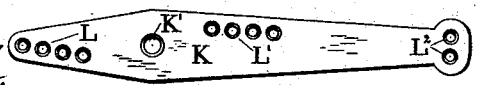

Centrally suspended from each of the cars A and A', by means of the stirrup J, is the perforated lever K. The lever K is pivoted through the opening K' to the stirrup J and has two series of holes L and L', with the two holes L² in one end, as best shown in Fig. 6. The hand-lever M, Figs. 1, 2 and 3 is pivoted to the floor at the front end of car A, the dash-board being broken away, in Figs. 1 and 3, to show said lever in position.

A shaft N, Figs. 1, 2, 4 and 5, having the integral arms N' and N², is suspended, by the hangers O, from the under side, at one end of each of the cars A and A' and at one side of the draw-head E'. The double-armed shaft N is of essentially the form shown in Fig. 5 and the arm N' terminates in the ear n which is approximately under the center of the draw-head E', when said shaft is in position.

The rod P, Figs. 1, 2 and 3, connects the lower terminal of the hand-lever M, on the car A, with the lever K, being secured within the forward opening L². From the rear opening L², in the lever K, the rod Q, Figs. 1 and 2, extends to the free end of the shaft-arm N². A chain or rod R, Figs. 1 and 2, under the draw-bar E, connects the ears $n$, $n$ of the two shaft-arms N' and is of essentially the same length as said draw-bar. Under the car A', the rod Q, Figs. 1 and 2, extends from the shaft-arm N² to the forward opening L² in the lever K. The two rods S, Figs. 1, 2 and 3, connect the forward brake-bars, of the cars A and A', with the levers K, being fastened through one of the holes L, in each of said levers. Extending from one of the openings L', in the lever K, to the rear brake-bar is the rod S', Figs. 1, 2 and 4, one under each car.

It will be readily seen from the foregoing description that, if the hand-lever M be drawn toward an operator standing upon the front platform of the car A, the brake-shoes F' will be forced against the wheels of both cars at the same time. As the end of the long arm of the lever K is drawn forward by the hand-lever M and the rod P, the rods S and S' will draw the brake-bars of the car A, toward the wheels and at the same time the double-armed shafts N, N will be rotated by the rods Q and R. The forward movement of the shaft-arm N², on car A', draws forward the end of the lever K, to which the rod Q' is attached, and, by means of the rods S and S', applies the brake-shoes to the wheels of said car A'. When the hand-lever M is released, the spring-hangers G will draw the brake-bars away from the wheels, as before described. Since the chain or rod R, which connects the shaft-arms N', N', is under the draw-bar E and of essentially the same length as said draw-bar, and since the power which actuates the brake-bars on the trail-car A' is conveyed through said rod R, the brake-shoes are applied to the wheels of the trail-car as readily and with the same force as to the wheels of the forward car, either when on a curved or a straight track.

The holes L and L', in the lever K, are for the purpose of adjusting the rods S and S'. In place of the hand-lever M a common twist brake-rod may be used, in which case the rod P would be connected to the end of said brake-rod by means of a chain. Chains may be substituted for the various rods herein described.

My invention may be used in connection with pulleys or any other equivalent of the device herein described and can be attached to the ordinary car truck, or otherwise arranged in relation to the car.

What I claim as my invention and desire to secure, by Letters Patent, is—

1. In a railway car brake, a shaft having two integral arms, one of said arms terminating in an ear, a lever centrally pivoted beneath a car and provided with openings, in combination with a series of rods or chains, brake-bars and shoes, and an actuating lever or brake-rod, in the manner substantially as and for the purpose set forth.

2. A perforated lever centrally pivoted beneath a car and a series of rods or chains, in combination with an actuating lever or brake-rod, a double-armed shaft attached to said car and a series of brake-bars and shoes, in the manner substantially as and for the purpose set forth.

3. The combination, in a railway car brake, of one or more double-armed shafts connected, by a series of rods or chains, with one or more perforated levers, said perforated levers connected, by a series of rods or chains, with the brake-bars and actuating lever or brake-rod of one or more cars, in the manner substantially as and for the purpose set forth.

In testimony whereof I affix my signature in presence of two witnesses.

MARCUS E. ELLSWORTH.

Witnesses:
    W. H. BURRIDGE,
    HENRY FORD.